United States Patent
Fujinaga

(10) Patent No.: US 11,722,078 B2
(45) Date of Patent: Aug. 8, 2023

(54) CONTROL APPARATUS AND METHOD OF CONTROLLING THE SAME

(71) Applicant: CANON KABUSHIKI KAISHA, Tokyo (JP)

(72) Inventor: Takashi Fujinaga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 17/234,876

(22) Filed: Apr. 20, 2021

(65) Prior Publication Data
US 2021/0336570 A1    Oct. 28, 2021

(30) Foreign Application Priority Data

Apr. 24, 2020  (JP) ................................. 2020-077592

(51) Int. Cl.
*H02P 8/12*      (2006.01)
*H04N 5/232*    (2006.01)
*H04N 23/695*   (2023.01)
*H04N 23/661*   (2023.01)

(52) U.S. Cl.
CPC .............. *H02P 8/12* (2013.01); *H04N 23/695* (2023.01); *H04N 23/661* (2023.01)

(58) Field of Classification Search
CPC ......... H02P 8/12; H02P 8/06; H04N 5/23299; H04N 5/23206
See application file for complete search history.

(56) References Cited

U.S. PATENT DOCUMENTS

| | | | |
|---|---|---|---|
| 2005/0151500 A1* | 7/2005 | Akiyama | H02P 23/18 318/650 |
| 2005/0278068 A1* | 12/2005 | Hong | G06T 7/70 700/259 |
| 2013/0162191 A1* | 6/2013 | Kashiwa | H02P 8/22 318/696 |
| 2014/0333250 A1* | 11/2014 | You | G03G 15/80 318/696 |

FOREIGN PATENT DOCUMENTS

JP    2019-009861 A    1/2019

* cited by examiner

*Primary Examiner* — Muhammad S Islam
*Assistant Examiner* — Bradley R Brown
(74) *Attorney, Agent, or Firm* — Cowan, Liebowitz & Latman, P.C.

(57) ABSTRACT

A control apparatus that controls a stepping motor, comprises a determination unit configured to determine a current value to be applied to the stepping motor by looking up a first driving table, which is to be looked up when driving is to be performed in a first driving direction, and a second driving table, which is to be looked up when driving is to be performed in a second driving direction in reverse of the first driving direction. The determination unit includes an interpolation calculation unit configured to calculate the current value by interpolation calculation that looks up both the first driving table and the second driving table, in a case in which driving is to be performed in a driving direction different from a driving direction of a preceding driving operation.

10 Claims, 10 Drawing Sheets

| TABLE NUMBER | CURRENT VALUE (A PHASE) | CURRENT VALUE (B PHASE) |
|---|---|---|
| 1 | 44[mA] | 999[mA] |
| 2 | 47[mA] | 999[mA] |
| 3 | 51[mA] | 999[mA] |
| ... | ... | ... |
| 256 | 998[mA] | -44[mA] |
| ... | ... | ... |
| 1024 | 40[mA] | 999[mA] |

| TABLE NUMBER | CURRENT VALUE (A PHASE) | CURRENT VALUE (B PHASE) |
|---|---|---|
| 1 | -43[mA] | 999[mA] |
| 2 | -39[mA] | 999[mA] |
| 3 | -35[mA] | 999[mA] |
| ... | ... | ... |
| 256 | 998[mA] | 44[mA] |
| ... | ... | ... |
| 1024 | -47[mA] | 999[mA] |

FIG. 3A

CW DRIVING TABLE 301

| TABLE NUMBER | CURRENT INFORMATION (A PHASE) | CURRENT INFORMATION (B PHASE) |
|---|---|---|
| 1 | 44[mA] | 999[mA] |
| 2 | 47[mA] | 999[mA] |
| 3 | 51[mA] | 999[mA] |
| ... | ... | ... |
| 256 | 998[mA] | -44[mA] |
| ... | ... | ... |
| 300 | 970[mA] | -239[mA] |
| ... | ... | ... |
| 1024 | 40[mA] | 999[mA] |

CCW DRIVING TABLE 302

| TABLE NUMBER | CURRENT INFORMATION (A PHASE) | CURRENT INFORMATION (B PHASE) |
|---|---|---|
| 1 | -43[mA] | 999[mA] |
| 2 | -39[mA] | 999[mA] |
| 3 | -35[mA] | 999[mA] |
| ... | ... | ... |
| 256 | 998[mA] | 44[mA] |
| ... | ... | ... |
| 300 | 979[mA] | -200[mA] |
| ... | ... | ... |
| 1024 | -47[mA] | 999[mA] |

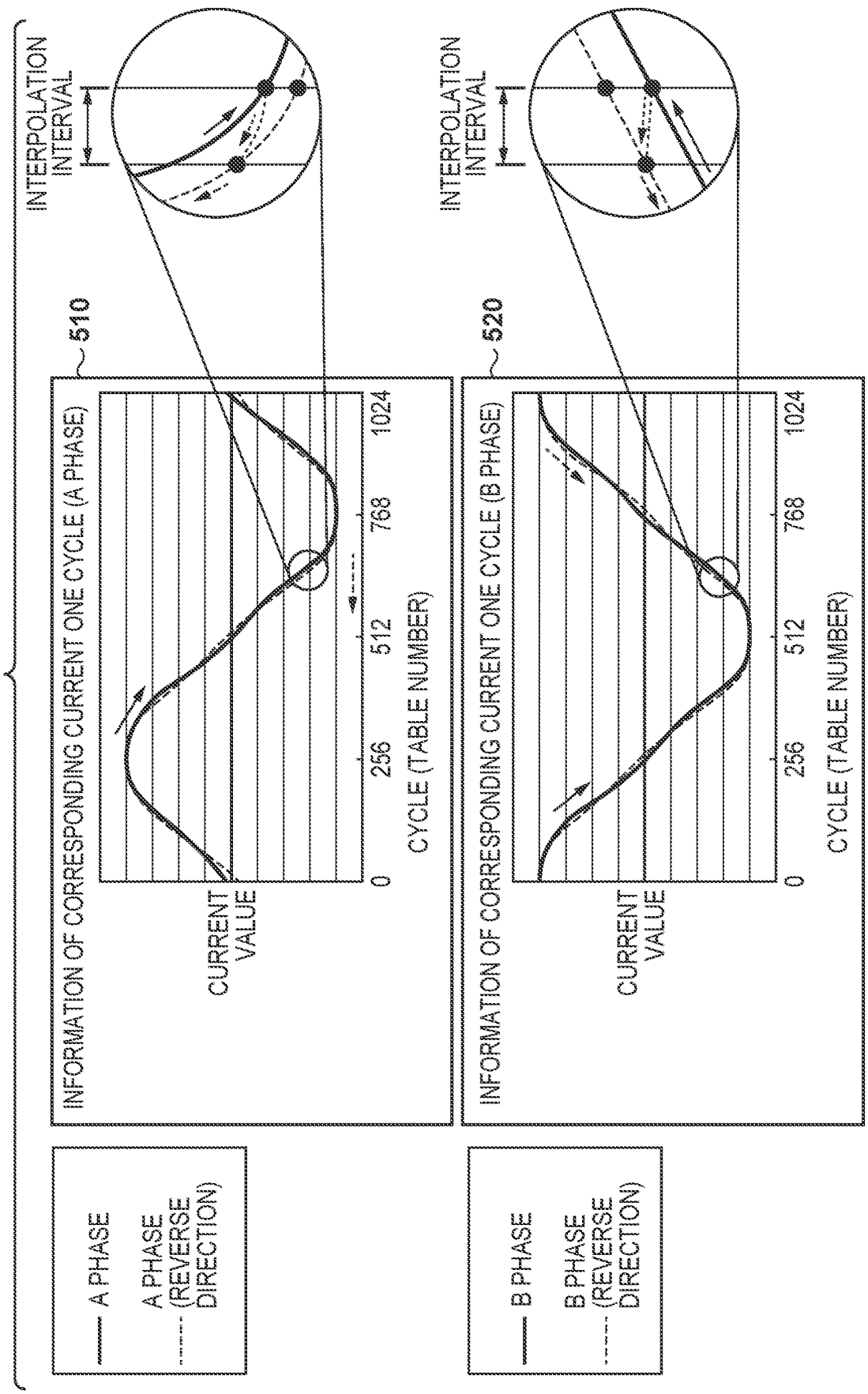

CONTROL APPARATUS AND METHOD OF CONTROLLING THE SAME

BACKGROUND OF THE INVENTION

Field of the Invention

The present invention relates to control of a stepping motor.

Description of the Related Art

A stepping motor is used in many embedded products such as an OA device, a medical device, a network camera that has a pan-tilt-zoom (PTZ) function, and the like. A technique (microstepping driving) for performing precision driving by generating a sine wave excitation current is present as an operation for controlling the stepping motor.

In a stepping motor, a cogging torque is generated by a magnetic attractive force of a rotor and a stator. As a result, under a low-speed driving condition, precise constant speed driving may not be performed even if a sine wave excitation current is used. For example, the speed of movement in a pan direction will become nonuniform if this phenomenon occurs during the panning control of a camera pan head, and this may cause discomfort to a user who observes the captured moving image. Japanese Patent Laid-Open No. 2019-9861 (patent literature 1) discloses a method for implementing constant speed driving by superimposing a specific frequency component on an excitation current waveform to compensate a cogging component.

When motor driving is to be performed by using a specific excitation current, a method that implements driving by holding information for calculating current values corresponding to electrical angles of one cycle and sequentially referring to the information is generally used. However, in order to compensate the cogging, the driving waveform needs to have the same wave form in a temporal direction. Hence, another table needs to be prepared if the information is to be referred in reverse order while compensating the cogging in the manner of the technique disclosed in patent literature 1.

However, in a case in which the motor is to be driven by switching the pan direction in an opposite direction (for example, CCW (counterclockwise)) after driving the motor in a given direction (for example, CW (clockwise)), the table to be referred will need to be switched. As a result, the reference value of the current will greatly change, and this may shake the driving target. For example, if this phenomenon occurs during the pan control of a camera pan head, it will cause shaking in the pan direction, and impair the convenience of the user.

SUMMARY OF THE INVENTION

According to one aspect of the present invention, a control apparatus that controls a stepping motor, comprises: a determination unit configured to determine a current value to be applied to the stepping motor by looking up a first driving table, which is to be looked up when driving is to be performed in a first driving direction, and a second driving table, which is to be looked up when driving is to be performed in a second driving direction in reverse of the first driving direction, wherein the determination unit includes an interpolation calculation unit configured to calculate the current value by interpolation calculation that looks up both the first driving table and the second driving table, in a case in which driving is to be performed in a driving direction different from a driving direction of a preceding driving operation.

The present invention suitably controls the driving of a stepping motor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a view showing an example of driving tables according to the first embodiment;

FIGS. 5B-1 and 5B-2 are views for exemplarily explaining the interpolation calculation processing.

DESCRIPTION OF THE EMBODIMENTS

Figure 1A:
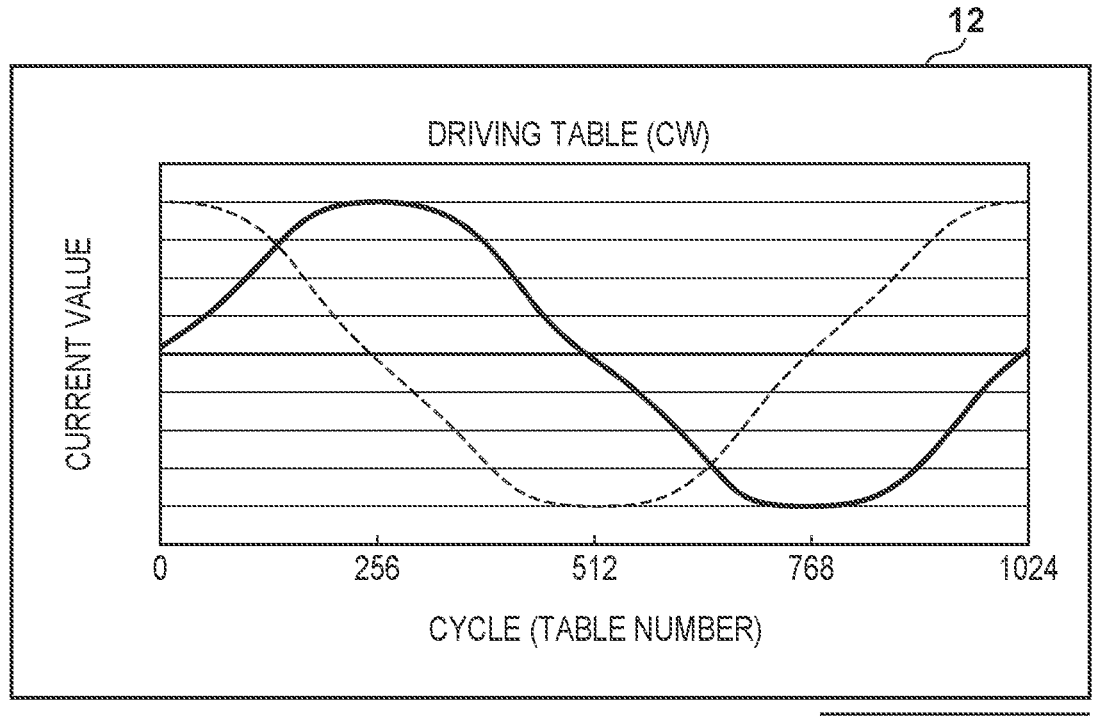
FIG. 1A is a view showing an example of a driving table (CW)

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A remote camera that performs pan/tilt driving by using a 2-phase stepping motor will be exemplified as the first embodiment of a motor control apparatus according to the present invention hereinafter.

<Outline>

In a case in which driving is to be performed by superimposing a harmonic component on a current waveform as in patent literature 1 described in the Description of the Related Art, a subtle deviation can be generated between an electrical angle of an excitation current waveform and a mechanical angle of an actual motor. Hence, a current waveform that includes an asymmetric component in a temporal direction can be obtained. On the other hand, since the influence of cogging will be the same regardless of the rotation direction (CW or CCW) of the motor, the waveform needs be the same with respect to the temporal direction even when driven in either direction.

In addition, when the motor is to be driven by a specific excitation current, a method that implements driving by holding information (to be referred to as a driving table hereinafter) for calculating current values corresponding to electrical angles of one cycle and sequentially looking up the information is generally used.

Figure 1B:
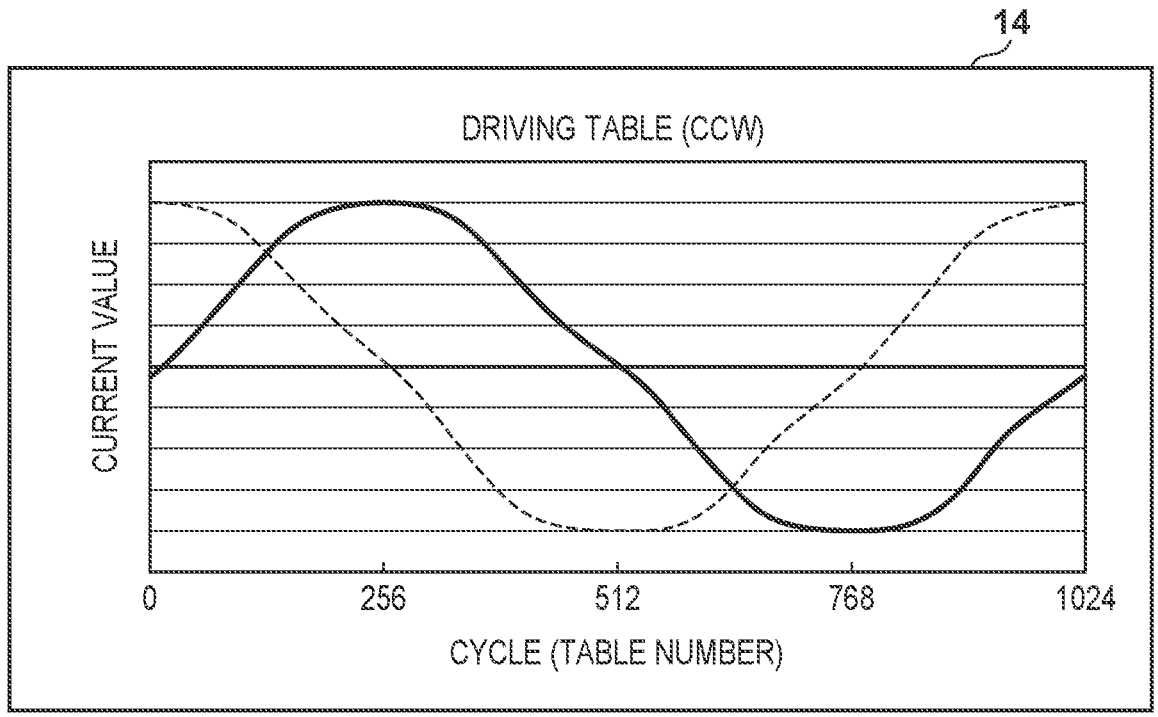
FIG. 1B is a view showing an example of another driving table (CCW)

FIGS. 1A and 1B are views showing examples of driving tables. FIG. 1A shows a CW driving table 11 and a graph 12 of this driving table. The driving amount and the driving speed can be controlled by sequentially updating the information of a designated target position to a given number of the table at a predetermined cycle. In general, the pan or tilt driving direction can be reversed when sequential updating is performed by looking up the driving table in a reverse order.

However, to compensate the cogging in the aforementioned manner, the driving waveform needs to have the same waveform in the temporal direction. Hence, another table needs to be prepared to refer to the information in a reverse direction while compensating the cogging. FIG. 1B shows a CCW driving table 13 and a graph 14 of this table. FIG. 1B shows a table obtained by inverting the driving table shown in FIG. 1A in the direction of the abscissa.

When reverse control of the rotation direction is to be performed in a case in which a look-up is to be performed by switching between two tables in accordance with the rotation direction (CW or CCW) of the motor in this manner, a driving target may shake because the reference value of the current will greatly change depending on the timing of the reversal. Hence, the first embodiment will describe a method that executes interpolation calculation to suppress a fluctuation in the reference value of a current when the table to be looked up is switched.

<Apparatus Arrangement>

Figure 2A:
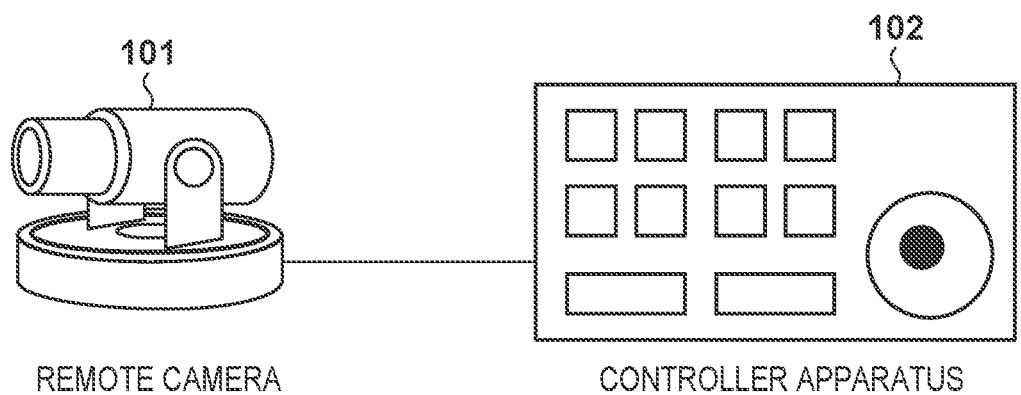
FIG. 2A is a view showing the arrangement of a monitoring system according to the first embodiment.
Figure 2B:
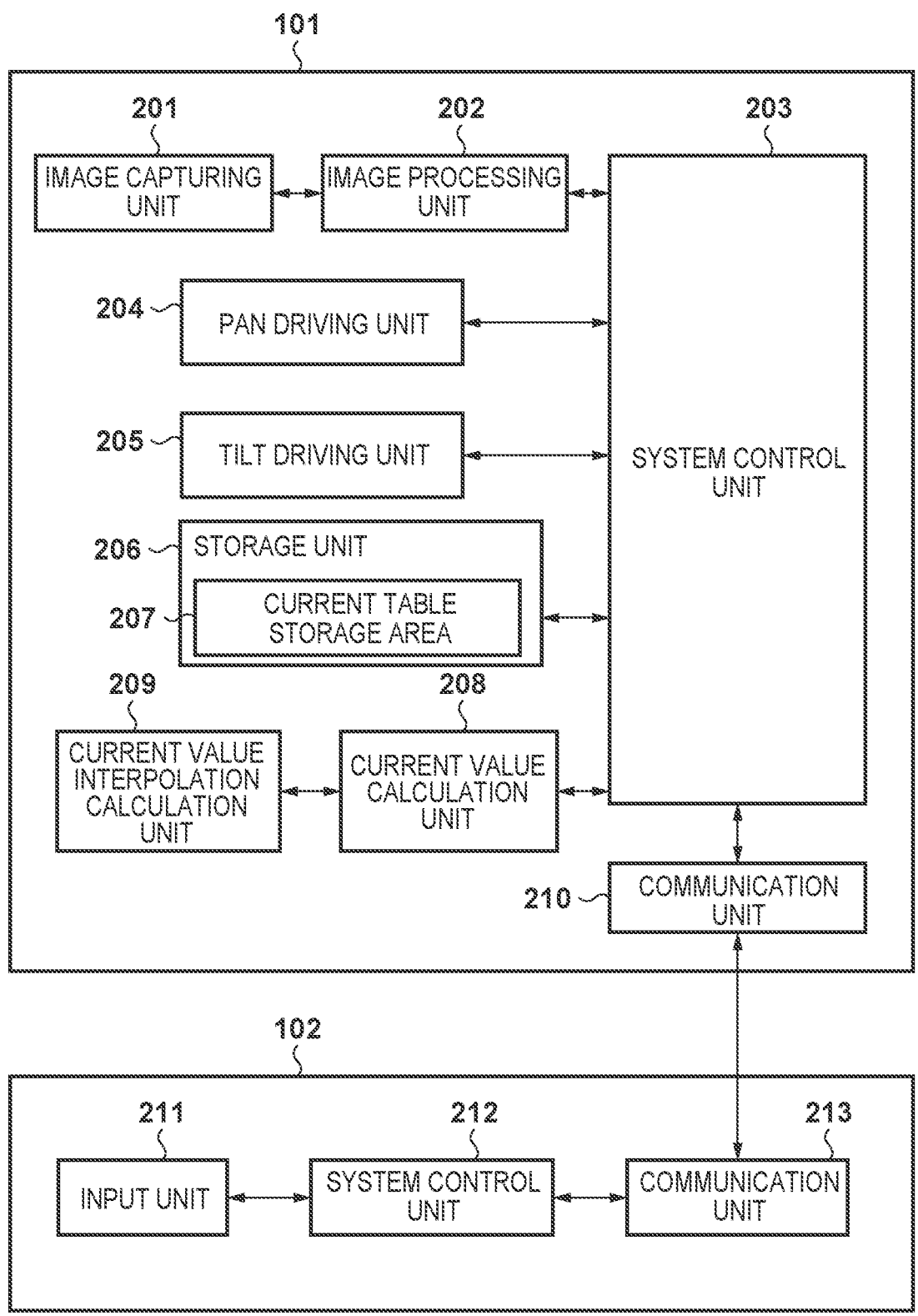
FIG. 2B is a block diagram showing the internal arrangement of a remote camera and a controller apparatus.

FIG. 2A is a view showing the arrangement of a monitoring system according to the first embodiment. The monitoring system is mainly formed by a remote camera 101 that has a pan/tilt function and a controller apparatus 102 that controls a pan head. FIG. 2B is a block diagram showing the internal arrangement of the remote camera 101 and the controller apparatus 102.

The remote camera 101 includes an image capturing unit 201, an image processing unit 202, a system control unit 203, a pan driving unit 204, a tilt driving unit 205, a storage unit 206, a current table storage area 207, a current value calculation unit 208, a current value interpolation calculation unit 209, and a communication unit 210. The communication unit 210 performs network communication with the controller apparatus 102 via a LAN or the like.

The image capturing unit 201 is formed from a lens and an image capturing element, performs image capturing of an object, and coverts the captured image into electrical signals. The image processing unit 202 generates image data by performing image processing and compression-coding processing on the electrical signals converted by the image capturing unit 201, and transmits the generated image data to the system control unit 203.

The pan driving unit 204 is formed from a mechanical driving system that performs a panning operation and a motor of a driving source of this mechanical driving system, and a pan driving mechanism is driven in the pan direction when the motor is driven. The tilt driving unit 205 is formed from a mechanical driving system that performs a tilting operation and a motor of a driving source of this mechanical driving system, and a tilt driving mechanism is driven in the tilt direction when the motor is driven. Each current value of the pan driving unit/tilt driving unit is calculated by the current value calculation unit 208 (to be described later).

The system control unit 203 analyzes a control command transmitted via the communication unit 210, and performs processing corresponding to the command. For example, if a pan/tilt driving instruction has arrived from the communication unit, the system control unit will perform processing to cause the current value calculation unit 208 to calculate each driving current based on the information of the corresponding current table in the storage unit 206, and apply each calculated current value to the pan driving unit 204 and the tilt driving unit 205 to perform the pan/tilt operation.

The storage unit 206 stores the image quality adjustment parameters and network setting values, and the system control unit 203 is able to refer to previously set values even when reactivation has been performed. The current table storage area 207 is in the storage unit 206, and holds a plurality of pieces of current table information (driving tables to be described later) corresponding to one cycle for generating a current waveform.

The current value calculation unit 208 calculates, from a current table stored in the current table storage area 207, a current value to be used to drive the motor. The current value calculation unit 208 also uses a current value that has undergone interpolation calculation by the current value interpolation calculation unit 209 under a specific condition such as a reverse operation.

The current value interpolation calculation unit 209 performs interpolation calculation based on the value of a plurality of current tables. For example, an interpolated current value can be calculated by linear combination (convex combination) of values of two kinds of current tables.

The controller apparatus 102 includes an input unit 211, a system control unit 212, and a communication unit 213. The communication unit 213 performs network communication with the remote camera 101 via a LAN or the like.

The input unit 211 is a functional unit that accepts various kinds of operations from a user. For example, the input unit may be implemented by buttons, a joystick, and the like. The system control unit 212 transmits, in accordance with the operation by the user, a control command to the remote camera via the communication unit 213.

<Driving Table>

FIG. 3A is a view showing an example of driving tables according to the first embodiment. A method in which a motor is driven to a designated position by calculating a current by using a driving table based on an instruction from the user will be described with reference to FIG. 3A.

A CW driving table 301 and a CCW driving table 302 are held in the storage unit 206. Each of the CW driving table 301 and the CCW driving table 302 includes table numbers 303 and pieces of current information 304. Each piece of the current information 304 includes an A-phase current value and a B-phase current value.

The CW driving table 301 is a table looked up when the motor is to be driven in a clockwise (CW) direction when viewed from a predetermined axis, and the values will be looked up in ascending order during driving. The CCW driving table 302 is a table looked up when the motor is to be driven in a counterclockwise (CCW) direction when viewed from a predetermined axis, and the values will be looked up in descending order during driving.

Each table number 303 is an identification number corresponding to a target position designated by the user. For example, in a case in which one cycle of the table corresponds to the motor being driven and rotated 5 times, a user instruction to "drive only 7.5° in the CW direction" can be interpreted as a driving processing that corresponds to "look up table numbers corresponding to one and a half cycle interval in ascending order based on the CW driving table".

At this time, the CW driving table 301 is optimized to compensate the pulsation of the cogging torque when driving is to be performed in the CW direction. In addition, the CCW driving table 302 is optimized to compensate the pulsation of the cogging torque when driving is to be performed in the CCW direction. Hence, the current information (current values) of the CW driving table 301 and the current information (current values) of the CCW driving table 302 may not match for the same table number. As a result, a rapid current value transition can occur when the driving is to be reversed (when the lookup table is to be switched).

For example, consider a case in which a table number "300" of the CW driving table 301 has been reached by a driving operation in the CW direction and the driving operation is to be subsequently reversed in the CCW direction. In this case, current values 970 mA and −239 mA will be applied as the A-phase current value and the B-phase current value, respectively, in accordance with the CW driving table 301 at the ending of the driving operation in the CW direction. Thereafter, at the start of the driving operation in the CCW direction, the A-phase current value and the B-phase current value will shift to 979 mA and −200 mA, respectively, in accordance with the CCW driving table 302. That is, a current value transition with differences of 9 mA and 39 mA in the A-phase current value and the B-phase current value, respectively, is generated. That is, the current changes rapidly due to the switching of the tables, and the image of the remote camera 101 may blur.

Figure 3B:
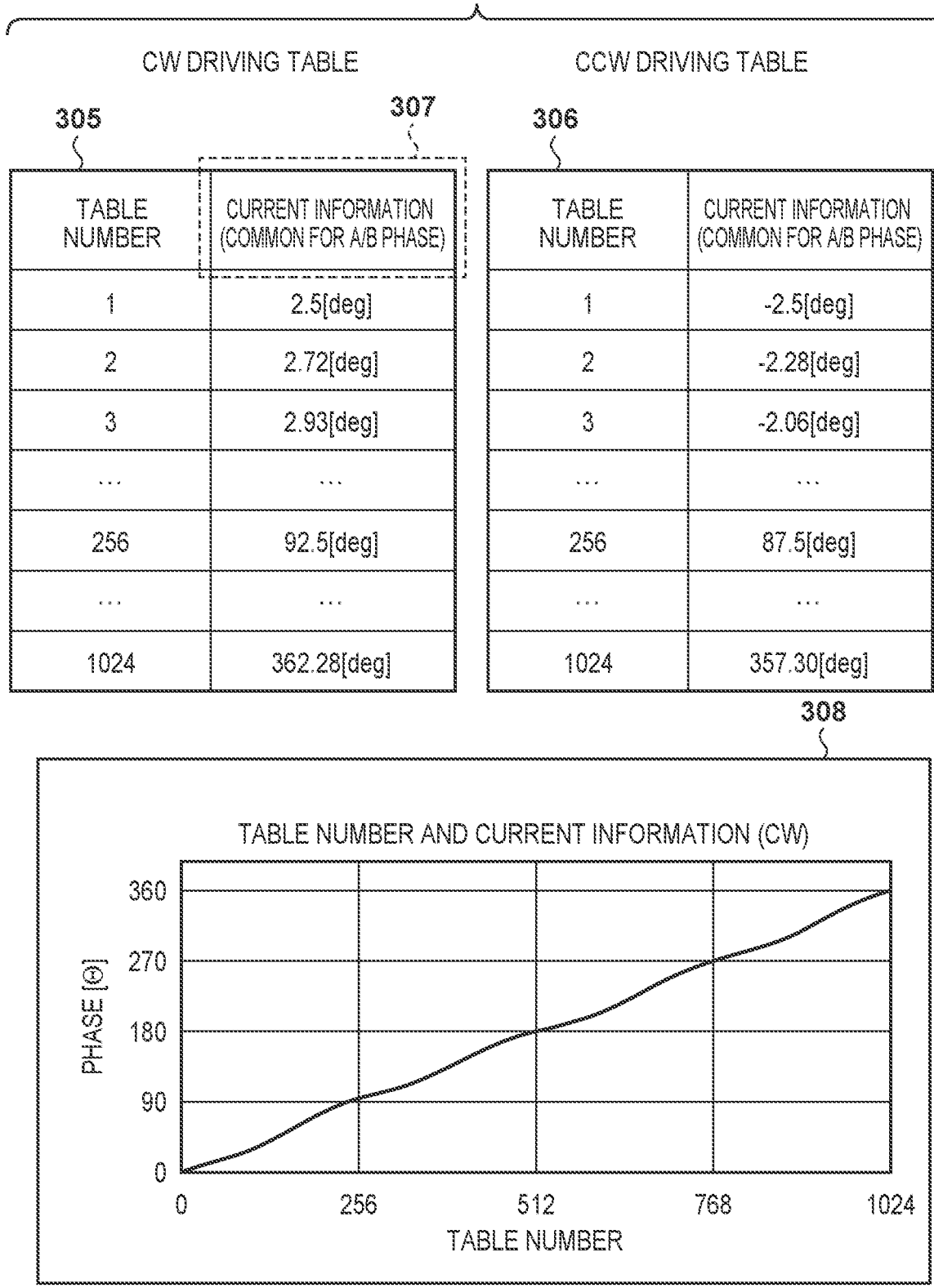
FIG. 3B is a view showing the correspondence of table numbers and current information.

FIG. 3B is a view showing another example of the driving table according to the first embodiment. Current information 307 included in each of a CW driving table 305 and a CCW driving table 306 is "a current value" or "information for calculating the current value" to be applied to the motor. When the motor is to be driven, a method in which "a current value" is directly looked up from a table or a method in which a current value is calculated based on "information for calculating the current value" will be used. An example of a method for calculating the current value will be shown hereinafter. Equation (1) and equation (2) are examples of mathematical expressions for deriving a current waveform of a 2-phase stepping motor from a variable θ (phase value).

$$I_A = I_m \sin \theta \quad (1)$$

$$I_B = I_m \cos \theta \quad (2)$$

In the CW driving table 305 and the CCW driving table 306, the current information 307 correspond to the value of the variable θ in each of equation (1) and equation (2). The current value calculation unit 208 calculates each current value from the variable θ by performing a calculation processing. At this time, if the current information 307 which represents the variable θ becomes a value proportional to the table number, the current value to be generated will be closer to a sine wave. In this manner, by using a phase value as "information for calculating the current value", the information can be used commonly for an A-phase current value and a B-phase current value.

A graph 308 shows the correspondence between each table number and the current information in the CW driving table 305. Since cogging compensation is the premise here, a nonlinear shape as shown in the graph 308 is set here to generate an intentionally deformed current waveform. In addition, since the current value to be looked up needs to be changed depending on the driving direction, the CW driving table 305 and the CCW driving table 306 need to be defined for each driving direction.

<Operation of Apparatus>

Figure 4:
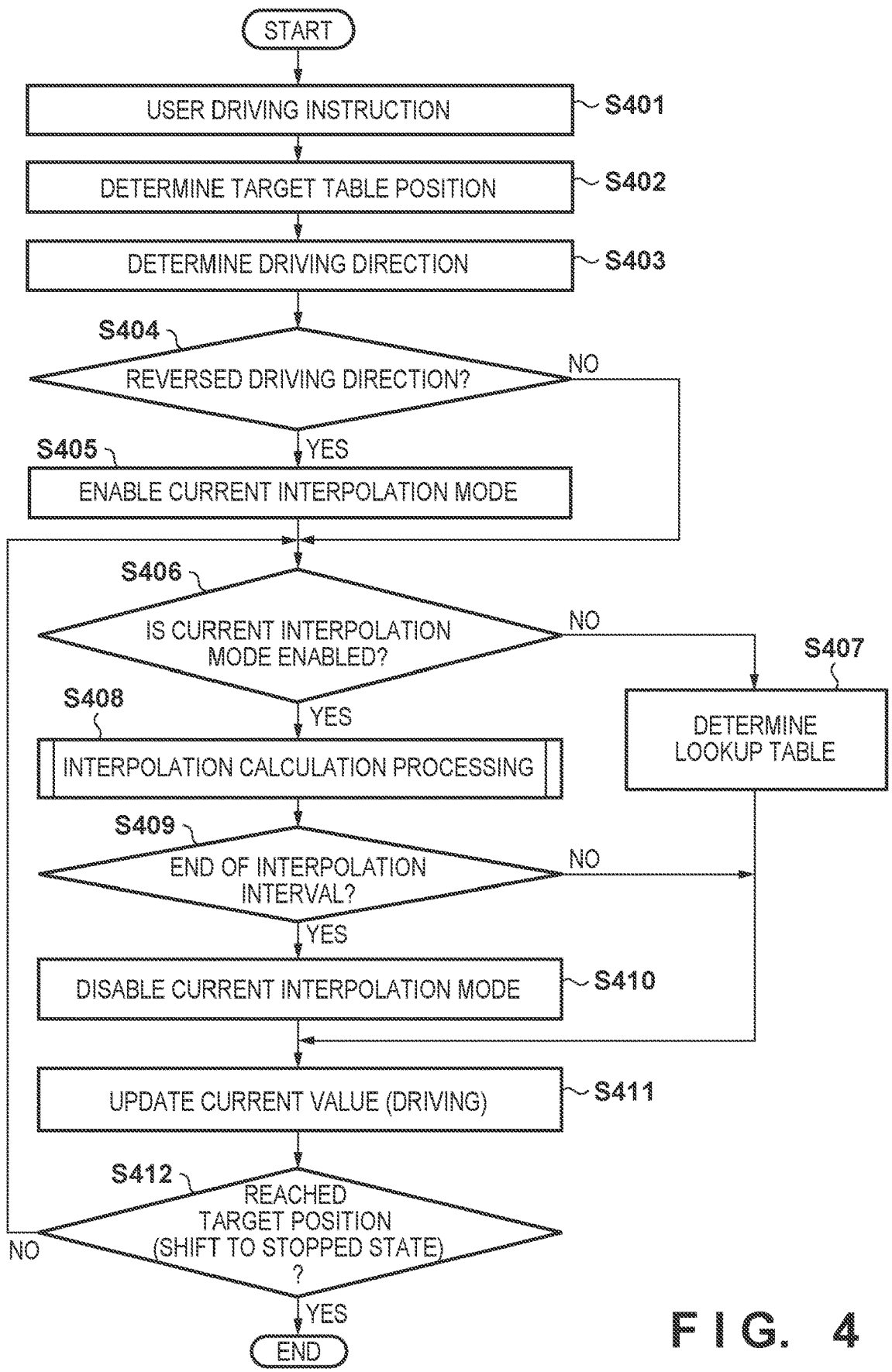
FIG. 4 is a flowchart of motor driving control according to the first embodiment.

FIG. 4 is a flowchart of motor driving control according to the first embodiment. The processing for suppressing a noncontinuous transition of the current when the driving direction is changed will be described with reference to FIG. 4. Note that the following operation is performed on each of the pan driving unit 204 and the tilt driving unit 205.

In step S401, the system control unit 203 accepts, via the controller apparatus 102, a driving instruction from the user. A driving instruction is an instruction for the remote camera 101 to drive the pan head to a given target position. As a more specific driving instruction, a method that designates a driving amount from an operation bar or a GUI may be used or a method that performs driving to a specific preset position held in advance in the storage unit 206 may be used.

In step S402, the system control unit 203 calculates the number and the cycle of the driving table corresponding to the target position designated by the user. For example, a case in which the target position is 32.5° and one cycle of the table corresponds to the motor being driven to rotate 5 times can be calculated as "the 512th table number of the 7th cycle after executing 6 cycles of the table". As described above, each of the current position and the target position designated by the user corresponds to "the number of cycles and the table number".

In step S403, the system control unit 203 compares the current position of the pan head held in the storage unit 206 and the target position designated by the user in step S401 to determine the driving direction. For example, the CW direction will be set as the driving direction if the numerical value indicating the current position is smaller than the numerical value indicating the target position, and the CCW direction will be set as the driving direction if the numerical value indicating the current position is larger than the numerical value indicating the target position. At this time, the driving direction may be determined by comparing "the number of cycles and the table number of the table representing the current position" and "the number of cycles and the table number of the table representing the target position".

In step S404, the system control unit 203 determines whether the driving direction determined in step S403 is the same as the driving direction of a previous operation (preceding driving operation). For example, if a driving instruction to drive the motor in the CCW direction is received in a stopped state in which a driving operation in the CW direction has been completed, it will be determined that the driving directions are not the same. If it is determined that the driving directions are not the same, that is, if the driving direction has been reversed, the process advances to step S405. If it is determined that the driving directions are the same, the process advances to step S406.

In step S405, the system control unit 203 enables a current interpolation mode. The current interpolation mode indicates that the driving will be performed based on the current value calculated by the current value interpolation calculation unit 209. The details of current interpolation will be described later with reference to FIG. 5A.

In step S406, the system control unit 203 determines whether the current interpolation mode has been enabled. If the current interpolation mode has not been enabled, the process transitions to step S407. If the current interpolation mode has been enabled, the process transitions to the interpolation calculation processing of step S408. Note that a predetermined interpolation interval is set in the interpolation calculation processing, and the interpolation calculation will be performed until the driving amount from the start of the driving operation exceeds the interpolation interval.

In step S407, the system control unit 203 determines, via the current value calculation unit 208, the table to be looked up based on the driving direction determined in step S403. That is, the system control unit will determine to use the CW driving table 301 if the driving direction is in the CW direction, and will determine to use the CCW driving table 302 if the driving direction is in the CCW direction.

In addition, based on the current position (current table number) and the driving direction, the table number and the current value to be looked up next will be obtained from the current table storage area 207. For example, in case in which the CW driving table has been selected, a table number which is "the current table number+1" and the current value corresponding to this table number will be obtained, and in a case in which the CCW driving table has been selected, a table number which is "the current table number−1" and the current value corresponding to this table number will be obtained. If the final or the beginning table number has been reached, it can transition to the final or the beginning table number on the opposite side.

In step S408, the system control unit 203 controls the current value interpolation calculation unit 209 and the current value calculation unit 208 so as to derive the current value by interpolation calculation. The current value interpolation calculation unit 209 and the current value calculation unit 208 perform interpolation calculation based on the current values of the two driving tables 301 and 302 and calculate a median current value. In particular, calculation is performed so that the current value transition will occur smoothly by changing the weights used during interpolation in accordance with the interpolation interval and the driving amount. The interpolation calculation processing will be described in detail later with reference to FIG. 5A.

In step S409, the system control unit 203 obtains the amount of change of the table number from the start of the driving operation, and determines whether the end of the interpolation interval has been reached. For example, assume a case in which the interpolation interval is 10 and the difference between the table number at the start of the driving operation and the current table number is 10. In such a case, it will be determined that the end of the interpolation interval has been reached and the interpolation processing need not be performed in the next driving operation. If it is determined that the end of the interpolation interval has been reached, the current interpolation mode is disabled in step S410, and the process transitions to step S411. Otherwise, the process directly transitions to step S411.

In step S411, the system control unit 203 updates the excitation current to be applied to the motor for each phase (the A phase and the B phase). That is, the current value obtained in step S407 or step S408 will be applied to each phase of the pan driving unit 204 or the tilt driving unit 205.

In step S412, the system control unit 203 determines whether the lookup position of the table has reached the target position. Note that whether the target position has been reached is determined based on whether "the number of cycles and the table number of the table representing the target position" calculated in step S402 have been reached. If it is determined that the target position has not been reached, the process returns to step S406. If it is determined that the target position has been reached, the current position and the driving direction are stored in the storage unit 206, and the processing ends.

Figure 5A:
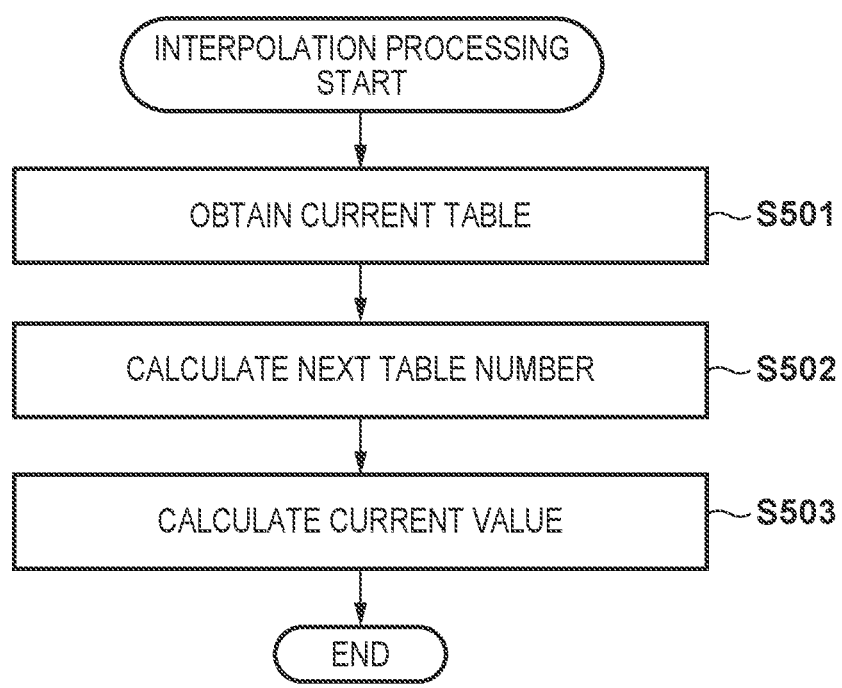
FIG. 5A is a flowchart showing the details of interpolation calculation processing (step S408)
Figures 2, 5B:
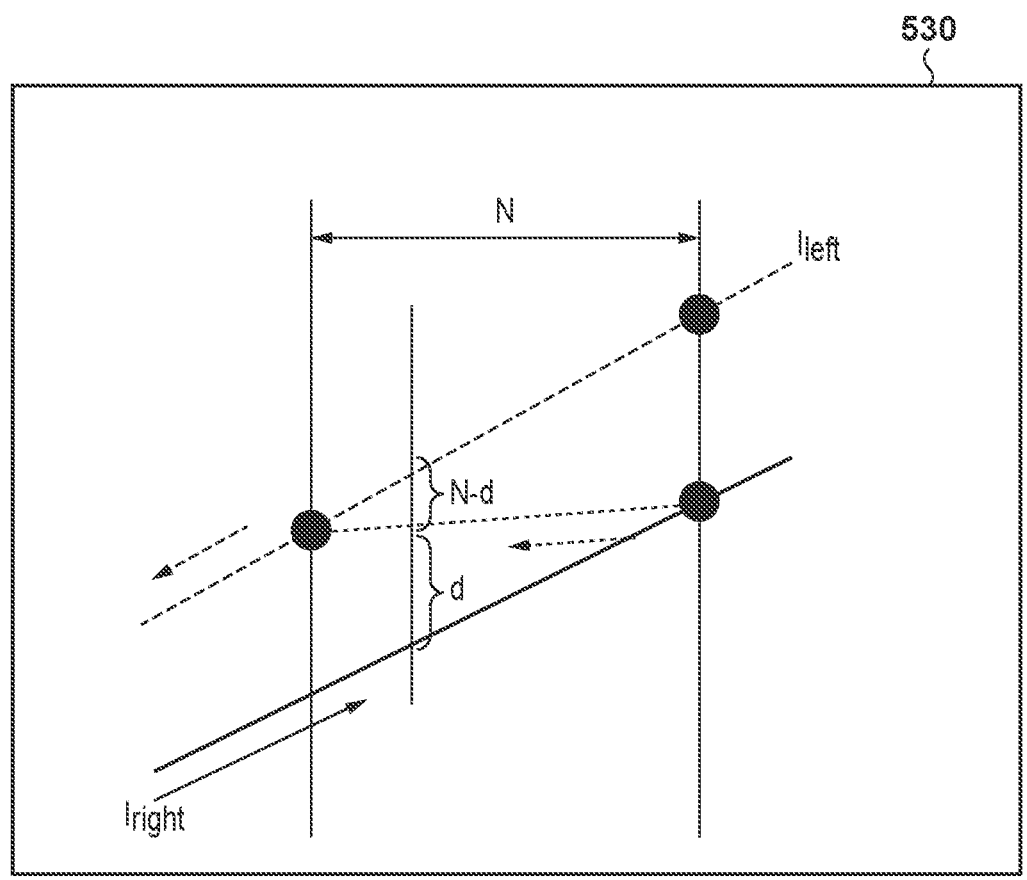

FIG. 5A is a flowchart showing the details of the interpolation calculation processing (step S408). In addition, FIGS. 5B-1 and 5B-2 are schematic views for explaining the interpolation calculation processing. More specifically, FIGS. 5B-1 and 5B-2 are schematic views showing the smooth current transition implemented by interpolation.

In step S501, the current value interpolation calculation unit 209 obtains the two driving tables 301 and 302 from the current table storage area 207.

In step S502, the current value interpolation calculation unit 209 obtains the table number to be looked up next. In a manner similar to the process of step S407, a table number which is "the current table number+1" will be obtained if the driving direction is the CW direction, and a table number which is "the current table number−1" will be obtained if the driving direction is the CCW direction. Note that if the final or the beginning table number has been reached, the cycle can transition to the final or the beginning table number on the opposite side.

In step S503, the current value interpolation calculation unit 209 calculates a current value $I_{mid}$ based on both of the two driving tables 301 and 302 obtained in step S501 and a table number t to be looked up next obtained in step S502. More specifically, the current value $I_{mid}$ is calculated based on an amount d of change in the table number and an interpolation interval N by $$I_{mid} = dI_{aft}(t) + (N-d)I_{bef}(t) \tag{3}$$

where $I_{bef}(t)$ and $I_{aft}(t)$ represent current values corresponding to the table number t. $I_{bef}(t)$ and $I_{aft}(t)$ represent a current value of a driving table in the previous driving direction and a current value of a driving table of the current driving direction, respectively. $I_{mid}$ is the current value obtained by the interpolation.

For example, a case in which a reverse driving operation in the CCW direction is performed after stopping immediately before from a driving operation in the CW direction will be exemplified. Since the value of the change amount d will become smaller than the value of (N−d) immediately after the reverse driving operation is started, the value of the interpolated current value Led will be close to the current value $I_{bef}(t)$ of the driving table in the CW driving direction. When the driving operation is continued, the value of the change amount d increases, and the value of the change amount d will become larger than the value of (N−d). Hence, the value of the interpolated current value Lam will be close to the current value $I_{aft}(t)$ of the driving table in the CCW driving direction. In this manner, the current value is calculated by interpolation calculation within the interpolation interval. As the value of the change amount d increases and d=N, the interpolation interval will end (that is, the processing will fall outside the interpolation interval) in step S409, and driving performed by looking up the CCW driving table 302 will be performed thereafter.

As described above, by changing the coefficient of each of the current value $I_{bef}(t)$ and the current value $I_{aft}(t)$ in a stepwise manner, driving can be performed by smoothly transitioning the current value as shown in FIGS. 5B-1 and 5B-2. A graph 510 and a graph 520 exemplify the changes in the A-phase current value and the B-phase current value, respectively. Each graph is accompanied by an enlarged view showing the portion where the driving direction changes from the CW direction to the CCW direction. A graph 530 is a schematic view of the current value derived by interpolation calculation.

Although an interval determination method of the interval N where interpolation is performed is not described above, the value of the interval N may be dynamically determined based on the difference between the two driving tables. For example, in a case in which the difference between the current value $I_{bef}(t)$ and the current value $I_{aft}(t)$ is large at the time of driving reversal, the interpolation interval N can be set long. Also, in a case in which the difference between the current value $I_{bef}(t)$ and the current value $I_{aft}(t)$ is small at the time of driving reversal, the interpolation interval N can be set short. By setting the interpolation interval in this manner, when the difference between the two current values is greater than a predetermined amount and a fluctuation can easily occur during driving reversal, it will be possible to use a longer interpolation interval to make the current change smoother and to further reduce the fluctuation. On the other hand, when the difference between the two current values is smaller than a predetermined amount and a fluctuation is less likely to occur during driving reversal, it will be possible to end the interpolation interval early and quickly shift to a driving operation based on an optimized driving table.

As described above, according to the first embodiment, two driving tables optimized for compensating the pulsation of the cogging torque can be used when driving by the stepping motor is to be performed. In particular, when reverse driving is to be performed, a driving current value will be calculated by using interpolation calculation that looks up the two driving tables. As a result, it will be possible to suppress the speed pulsation at the time of a driving operation and simultaneously suppress a fluctuation which is caused by a noncontinuous current transition when the driving direction is changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-077592, filed Apr. 24, 2020, which is hereby incorporated by reference herein in its entirety.

What is claimed is:

1. A control apparatus that controls a stepping motor of which position can be commanded by applied current values, comprising:
 a determination unit configured to determine a current value to be applied to the stepping motor by looking up a first driving table, which is to be looked up when driving is to be performed in a first driving direction, and a second driving table, which is to be looked up when driving is to be performed in a second driving direction in reverse of the first driving direction,
 wherein the determination unit includes an interpolation calculation unit configured to calculate the current value by interpolation calculation that looks up both the first driving table and the second driving table, in a case in which driving of the stepping motor is to be performed in a driving direction different from a driving direction of a preceding driving operation.

2. The apparatus according to claim 1, further comprising:
 an interval determining unit configured to determine an interpolation interval, in a range to be driven, in which the interpolation calculation is to be performed,
 wherein the interpolation calculation unit determines a current value for driving within the interpolation interval by the interpolation calculation, and determines a current for driving outside the interpolation interval by looking up one of the first driving table and the second driving table.

3. The apparatus according to claim 1, wherein the stepping motor is a 2-phase stepping motor that has an A phase and a B phase,
 each of the first driving table and the second driving table is formed as a table configured to hold a plurality of current values corresponding to one cycle for the A phase and one cycle for the B phase, and
 the plurality of current values are current values in which an influence of a cogging torque has been compensated.

4. The apparatus according to claim 1, wherein the stepping motor is a 2-phase stepping motor that has an A phase and a B phase,
 each of the first driving table and the second driving table is formed as a table configured to hold a plurality of phase values corresponding to one cycle in common for the A phase and the B phase, and
 the determination unit calculates, based on the plurality of phase values, a current value in which an influence of a cogging torque in each of the A phase and the B phase has been compensated.

5. The apparatus according to claim 1, wherein the interpolation calculation unit calculates a current value based on linear combination of two current values held by the first driving table and the second driving table, respectively.

6. The apparatus according claim 1, further comprising:
 a storage unit configured to store the first driving table and the second driving table.

7. The apparatus according to claim 2, wherein the interval determining unit dynamically determines the interpolation interval based on the difference between the two current values held by first driving table and the second driving table, respectively.

8. The apparatus according to claim 7, wherein the interval determining unit determines a longer interpolation interval if the difference is larger than a predetermined amount and determines a short interpolation interval if the difference is smaller than the predetermined amount.

9. A method of controlling a stepping motor of which position can be commanded by applied current values, comprising:
   determining a current value to be applied to the stepping motor by looking up a first driving table, which is to be looked up when driving is to be performed in a first driving direction, and a second driving table, which is to be looked up when driving is to be performed in a second driving direction in reverse of the first driving direction,
   wherein in the determining, the current value is calculated by interpolation calculation that looks up both the first driving table and the second driving table in a case in which driving of the stepping motor is to be performed in a driving direction different from a driving direction of a preceding driving operation.

10. A non-transitory computer-readable recording medium storing a program for causing a computer to execute a method of controlling a stepping motor of which position can be commanded by applied current values, comprising:
    determining a current value to be applied to the stepping motor by looking up a first driving table, which is to be looked up when driving is to be performed in a first driving direction, and a second driving table, which is to be looked up when driving is to be performed in a second driving direction in reverse of the first driving direction,
    wherein in the determining, the current value is calculated by interpolation calculation that looks up both the first driving table and the second driving table in a case in which driving of the stepping motor is to be performed in a driving direction different from a driving direction of a preceding driving operation.

* * * * *